US010800480B2

(12) United States Patent
Nishikawa et al.

(10) Patent No.: US 10,800,480 B2
(45) Date of Patent: Oct. 13, 2020

(54) HYDRAULIC OPERATING DEVICE

(71) Applicant: SHIMANO INC., Sakai (JP)

(72) Inventors: Yusuke Nishikawa, Sakai (JP);
Takuma Sakai, Sakai (JP); Nobuyoshi Fujii, Sakai (JP); Yoshimitsu Miki, Sakai (JP); Masahiro Nakakura, Sakai (JP)

(73) Assignee: SHIMANO INC., Sakai (JP)

( * ) Notice: Subject to any disclaimer, the term of this patent is extended or adjusted under 35 U.S.C. 154(b) by 175 days.

(21) Appl. No.: 16/131,084

(22) Filed: Sep. 14, 2018

(65) Prior Publication Data

US 2020/0086944 A1   Mar. 19, 2020

(51) Int. Cl.
*B62L 3/02*   (2006.01)
*B62K 23/06*   (2006.01)
*B60T 7/10*   (2006.01)
*F16D 55/228*   (2006.01)
*B60T 11/16*   (2006.01)
*F16D 55/00*   (2006.01)

(52) U.S. Cl.
CPC ............ *B62L 3/023* (2013.01); *B60T 7/10* (2013.01); *B60T 11/165* (2013.01); *B62K 23/06* (2013.01); *F16D 55/228* (2013.01); *F16D 2055/0025* (2013.01)

(58) Field of Classification Search
CPC . B23L 3/02; B23L 3/023; B23L 3/026; B62K 23/06; G05G 1/04; B60T 7/10; B60T 7/102; B60T 11/10; B60T 11/16; B60T 11/165
See application file for complete search history.

(56) References Cited

U.S. PATENT DOCUMENTS

| 3,935,930 | A | * | 2/1976 | Kine | ...................... | B62L 3/023 |
| | | | | | | 188/344 |
| 2006/0185940 | A1 | * | 8/2006 | Tsai | ........................ | B62L 3/02 |
| | | | | | | 188/24.12 |
| 2015/0367908 | A1 | * | 12/2015 | Kariyama | ............... | B60T 17/04 |
| | | | | | | 188/72.4 |
| 2017/0259877 | A1 | * | 9/2017 | Thompson | .............. | B60T 11/16 |
| 2018/0274562 | A1 | * | 9/2018 | Chambers | .............. | B62M 25/08 |

FOREIGN PATENT DOCUMENTS

DE   202014000348 U1   5/2014

* cited by examiner

*Primary Examiner* — Prasad V Gokhale
(74) *Attorney, Agent, or Firm* — Mori & Ward, LLP

(57) ABSTRACT

A hydraulic operating device comprises a base member, an operating member, a piston, and a mounting member. The base member includes a cylinder bore, a first hose-attachment hole, and a second hose-attachment hole. The first hose-attachment hole is configured to be in fluid communication with the cylinder bore. The second hose-attachment hole is configured to be in fluid communication with the cylinder bore. The operating member is pivotally coupled to the base member about a pivot axis. The mounting member is configured to couple the base member to a handlebar. The mounting member includes a mount opening through which the handlebar is to extend. The first hose-attachment hole, the second hose-attachment hole, and the mount opening are provided on a reference plane perpendicular to the pivot axis.

20 Claims, 14 Drawing Sheets

HYDRAULIC OPERATING DEVICE

BACKGROUND OF THE INVENTION

Field of the Invention

The present invention relates to a hydraulic operating device.

Discussion of the Background

A human-powered vehicle includes a hydraulic system configured to operate a hydraulic component.

SUMMARY OF THE INVENTION

In accordance with a first aspect of the present invention, a hydraulic operating device comprises a base member, an operating member, a piston, and a mounting member. The base member includes a cylinder bore, a first hose-attachment hole, and a second hose-attachment hole. The first hose-attachment hole is configured to be in fluid communication with the cylinder bore. The second hose-attachment hole is configured to be in fluid communication with the cylinder bore. The operating member is pivotally coupled to the base member about a pivot axis. The piston is movably provided in the cylinder bore and is operatively coupled to the operating member to move relative to the base member in response to a pivotal movement of the operating member. The mounting member is configured to couple the base member to a handlebar. The mounting member includes a mount opening through which the handlebar is to extend. The first hose-attachment hole, the second hose-attachment hole, and the mount opening are provided on a reference plane perpendicular to the pivot axis.

With the hydraulic operating device according to the first aspect, it is possible to utilize the base member as both a left-hand side operating device and a right-hand side operating device. This can reduce a manufacturing cost of the hydraulic operating device.

In accordance with a second aspect of the present invention, the hydraulic operating device according to the first aspect is configured so that the mount opening has a mount center axis included in the reference plane.

With the hydraulic operating device according to the second aspect, it is possible to utilize the mounting member as both the left-hand side operating device and the right-hand side operating device. This can further reduce the manufacturing cost of the hydraulic operating device.

In accordance with a third aspect of the present invention, the hydraulic operating device according to the first or second aspect is configured so that the first hose-attachment hole has a first center axis included in the reference plane.

With the hydraulic operating device according to the third aspect, it is possible to effectively utilize the base member as both the left-hand side operating device and the right-hand side operating device.

In accordance with a fourth aspect of the present invention, the hydraulic operating device according to any one of the first to third aspects is configured so that the second hose-attachment hole has a second center axis included in the reference plane.

With the hydraulic operating device according to the fourth aspect, it is possible to effectively utilize the base member as both the left-hand side operating device and the right-hand side operating device.

In accordance with a fifth aspect of the present invention, the hydraulic operating device according to any one of the first to fourth aspects is configured so that the cylinder bore has a cylinder center axis included in the reference plane.

With the hydraulic operating device according to the fifth aspect, it is possible to effectively utilize the base member as both the left-hand side operating device and the right-hand side operating device.

In accordance with a sixth aspect of the present invention, the hydraulic operating device according to any one of the first to fifth aspects is configured so that the base member has a symmetric shape relative to the reference plane.

With the hydraulic operating device according to the sixth aspect, it is possible to effectively utilize the base member as both the left-hand side operating device and the right-hand side operating device.

In accordance with a seventh aspect of the present invention, the hydraulic operating device according to any one of the first to sixth aspects is configured so that the mount opening has a symmetric shape relative to the reference plane.

With the hydraulic operating device according to the seventh aspect, it is possible to effectively utilize the base member as both the left-hand side operating device and the right-hand side operating device.

In accordance with an eighth aspect of the present invention, the hydraulic operating device according to any one of the first to seventh aspects is configured so that the operating member has a symmetric shape relative to the reference plane.

With the hydraulic operating device according to the eighth aspect, it is possible to effectively utilize the base member as both the left-hand side operating device and the right-hand side operating device.

In accordance with a ninth aspect of the present invention, the hydraulic operating device according to any one of the first to seventh aspects is configured so that the base member includes an additional hole configured to be in fluid communication with the cylinder bore.

With the hydraulic operating device according to the ninth aspect, it is possible to utilize the additional hole as a bleeding port or other uses.

In accordance with a tenth aspect of the present invention, the hydraulic operating device according to the ninth aspect is configured so that the additional hole includes an additional opening having an additional center axis included in the reference plane.

With the hydraulic operating device according to the tenth aspect, it is possible to effectively utilize the base member as both the left-hand side operating device and the right-hand side operating device.

In accordance with an eleventh aspect of the present invention, the hydraulic operating device according to the ninth or tenth aspect is configured so that the cylinder center axis is provided between the first hose-attachment hole and the additional hole as viewed along the pivot axis.

With the hydraulic operating device according to the eleventh aspect, it is possible to utilize a space provided on a reverse side of the first hose-attachment hole relative to the cylinder center axis.

In accordance with a twelfth aspect of the present invention, the hydraulic operating device according to any one of the ninth to eleventh aspects further comprises a plug threadedly engaged with the additional hole.

With the hydraulic operating device according to the twelfth aspect, it is possible to open and close the additional hole as necessary.

In accordance with a thirteenth aspect of the present invention, the hydraulic operating device according to any one of the first to twelfth aspects is configured so that the mount opening has a mount center axis. At least one of the first hose-attachment hole and the second hose-attachment hole faces toward the mount center axis of the mount opening as viewed along the pivot axis.

With the hydraulic operating device according to the thirteenth aspect, it is possible to utilize a space provided between the base member and the handlebar.

In accordance with a fourteenth aspect of the present invention, the hydraulic operating device according to any one of the first to thirteenth aspects is configured so that the mount opening has a mount center axis. The first hose-attachment hole and the second hose-attachment hole are closer to the mount center axis than the pivot axis in a perpendicular direction perpendicular to both the pivot axis and the mount center axis.

With the hydraulic operating device according to the fourteenth aspect, it is possible to improve stability of the orientation of the base member relative to the handlebar in the mounting state with creating a space for the first hose-attachment hole and the second hose-attachment hole.

In accordance with a fifteenth aspect of the present invention, the hydraulic operating device according to any one of the first to fourteenth aspects is configured so that the mount opening has a mount center axis. The first hose-attachment hole and the second hose-attachment hole are provided between the pivot axis and the mount center axis in a perpendicular direction perpendicular to both the pivot axis and the mount center axis.

With the hydraulic operating device according to the fifteenth aspect, it is possible to utilize a space between the base member and the handlebar in the mounting state for a hydraulic hose.

In accordance with a sixteenth aspect of the present invention, the hydraulic operating device according to any one of the first to fifteenth aspects is configured so that the mount opening has a mount center axis. The first hose-attachment hole is provided between the pivot axis and the second hose-attachment hole in a mount axis direction parallel to the mount center axis.

With the hydraulic operating device according to the sixteenth aspect, it is possible to utilize a space between the pivot axis and the second hose-attachment hole for the first hose-attachment hole.

In accordance with a seventeenth aspect of the present invention, the hydraulic operating device according to any one of the first to sixteenth aspects is configured so that the mount opening has a mount center axis. The cylinder bore has a cylinder center axis. The cylinder center axis is non-perpendicular to the mount center axis as viewed along the pivot axis.

With the hydraulic operating device according to the seventeenth aspect, it is possible to improve flexibility of designing the mounting member.

In accordance with an eighteenth aspect of the present invention, the hydraulic operating device according to any one of the first to seventeenth aspects is configured so that the mount opening has a mount center axis. The cylinder bore has a cylinder center axis. The cylinder center axis is non-parallel to the mount center axis as viewed along the pivot axis.

With the hydraulic operating device according to the eighteenth aspect, it is possible to improve flexibility of designing the mounting member.

In accordance with a nineteenth aspect of the present invention, the hydraulic operating device according to any one of the first to eighteenth aspects is configured so that the mount opening has a mount center axis. The base member includes a support portion configured to contact an outer circumferential surface of the handlebar without clamping the handlebar in a mounting state where the handlebar extends through the mount opening of the mounting member. The support portion is spaced apart from the mounting member in a mount axis direction parallel to the mount center axis.

With the hydraulic operating device according to the nineteenth aspect, the support portion can improve stability of the orientation of the base member relative to the handlebar in the mounting state.

In accordance with a twentieth aspect of the present invention, the hydraulic operating device according to the nineteenth aspect is configured so that the support portion includes a groove through which a hydraulic hose attached to one of the first hose-attachment hole and the second hose-attachment hole is to extend in the mounting state.

With the hydraulic operating device according to the twentieth aspect, the support portion can improve stability of the hydraulic hose relative to the handlebar in the mounting state with improving stability of the orientation of the base member relative to the handlebar.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
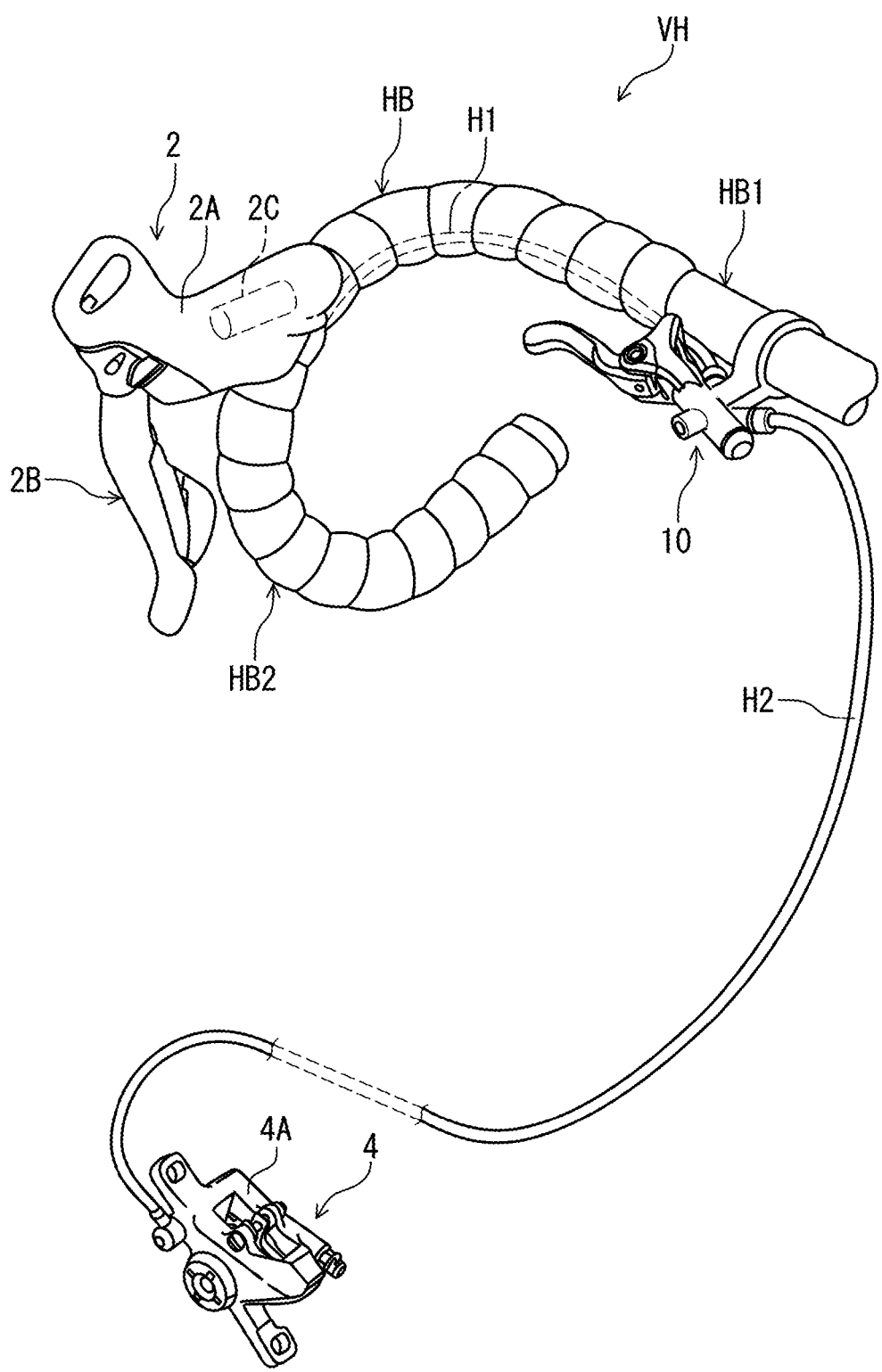
FIG. 1 is a schematic perspective view of a part of a human-powered vehicle including a hydraulic operating device in accordance with an embodiment.

The embodiment(s) will now be described with reference to the accompanying drawings, wherein like reference numerals designate corresponding or identical elements throughout the various drawings.

As seen in FIG. 1, a hydraulic operating device 10 is configured to be mounted to a handlebar HB of a human-powered vehicle VH. The hydraulic operating device 10 is configured to be connected to an additional hydraulic operating device 2 with a first hydraulic hose H1. The additional hydraulic operating device 2 is configured to be mounted to the handlebar HB. The hydraulic operating device 10 is configured to be connected to a hydraulic operated device 4 with a second hydraulic hose H2. The additional hydraulic operating device 2 is configured to operate the hydraulic operated device 4 via the hydraulic operating device 10. The hydraulic operating device 10 is configured to operate the hydraulic operated device 4. In this embodiment, the hydraulic operated device 4 is a disc brake caliper. However, the hydraulic operated device 4 is not limited to the brake caliper. The first hydraulic hose H1 can also be referred to as a hydraulic hose H1. The second hydraulic hose H2 can also be referred to as a hydraulic hose H2.

For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. In this embodiment, the human-powered vehicle VH preferably has a smaller size than that of a four-wheeled automobile. However, the human-powered vehicle VH can have an arbitrary size. For example, the human-powered vehicle VH can have a larger size than that of the four-wheeled automobile. Examples of the human-powered vehicle VH include a bicycle, a tricycle, and a kick scooter. In this embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VII can be an E-bike.

In this embodiment, the handlebar HB is a drop-down handlebar and includes a straight part HB1 and a curved drop-down part HB2. The hydraulic operating device 10 is configured to be mounted to the straight part HB1. The additional hydraulic operating device 2 is configured to be mounted to the curved drop-down part HB2. However, the locations of the hydraulic operating device 10 and the additional hydraulic operating device 2 are not limited to this embodiment.

Figure 2:
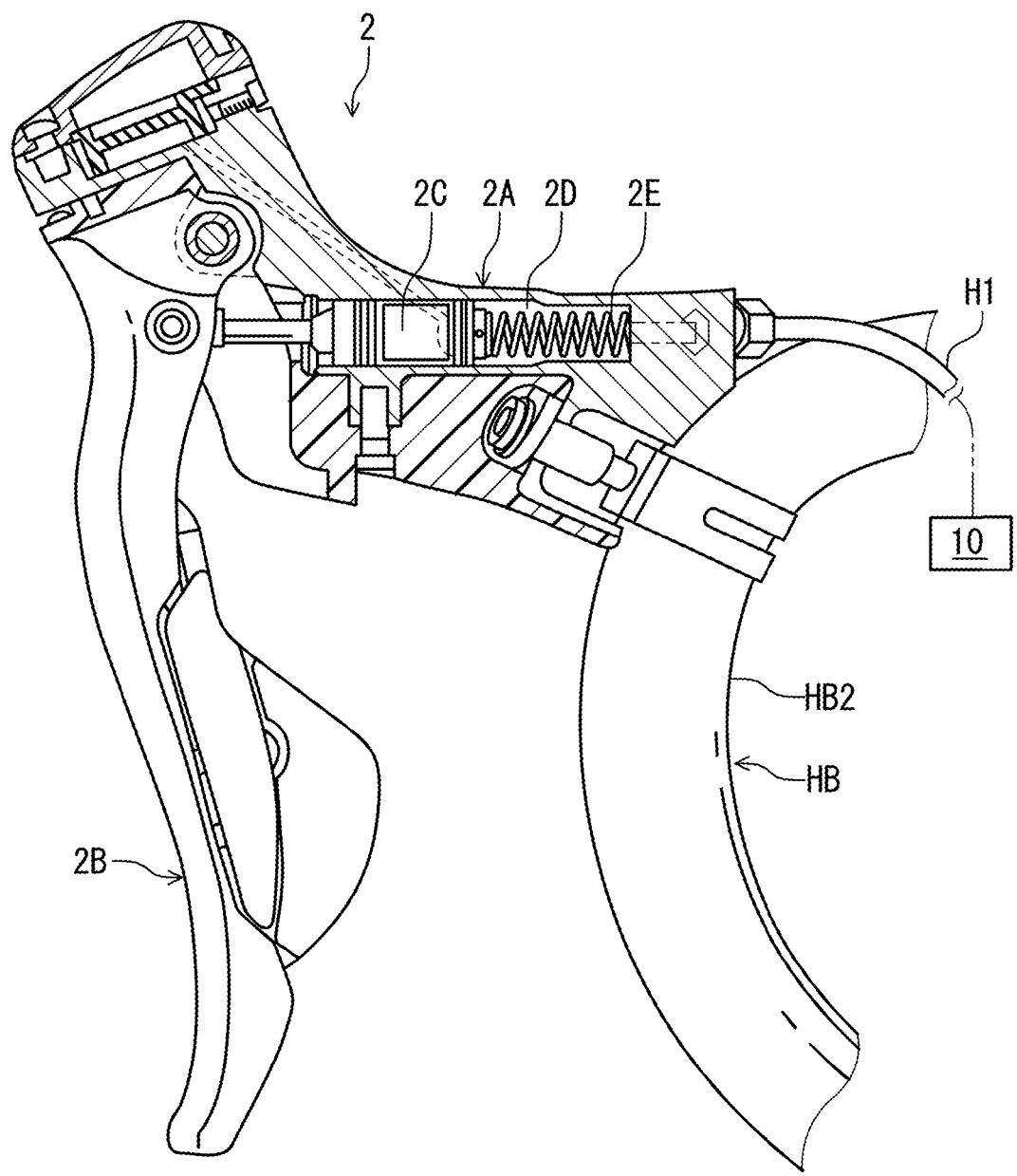
FIG. 2 is a cross-sectional view of an additional hydraulic operating device of the human-powered vehicle illustrated in FIG. 1.

As seen in FIG. 2, the additional hydraulic operating device 2 includes a bracket 2A, a lever 2B, a master piston 2C, and a master chamber 2D. The bracket 2A includes a master cylinder bore 2E. The lever 2B is pivotally coupled to the bracket 2A. The master piston 2C is movably provided in the master cylinder bore 2E and is coupled to the lever 2B. The master piston 2C and the master cylinder bore 2E define the master chamber 2D. The master chamber 2D is in fluid communication with the hydraulic operating device 10 with the first hydraulic hose H1. The additional hydraulic operating device 2 is configured to generate a hydraulic pressure in the master chamber 2D in response to a pivotal movement of the lever 2B relative to the bracket 2A.

Figure 3:
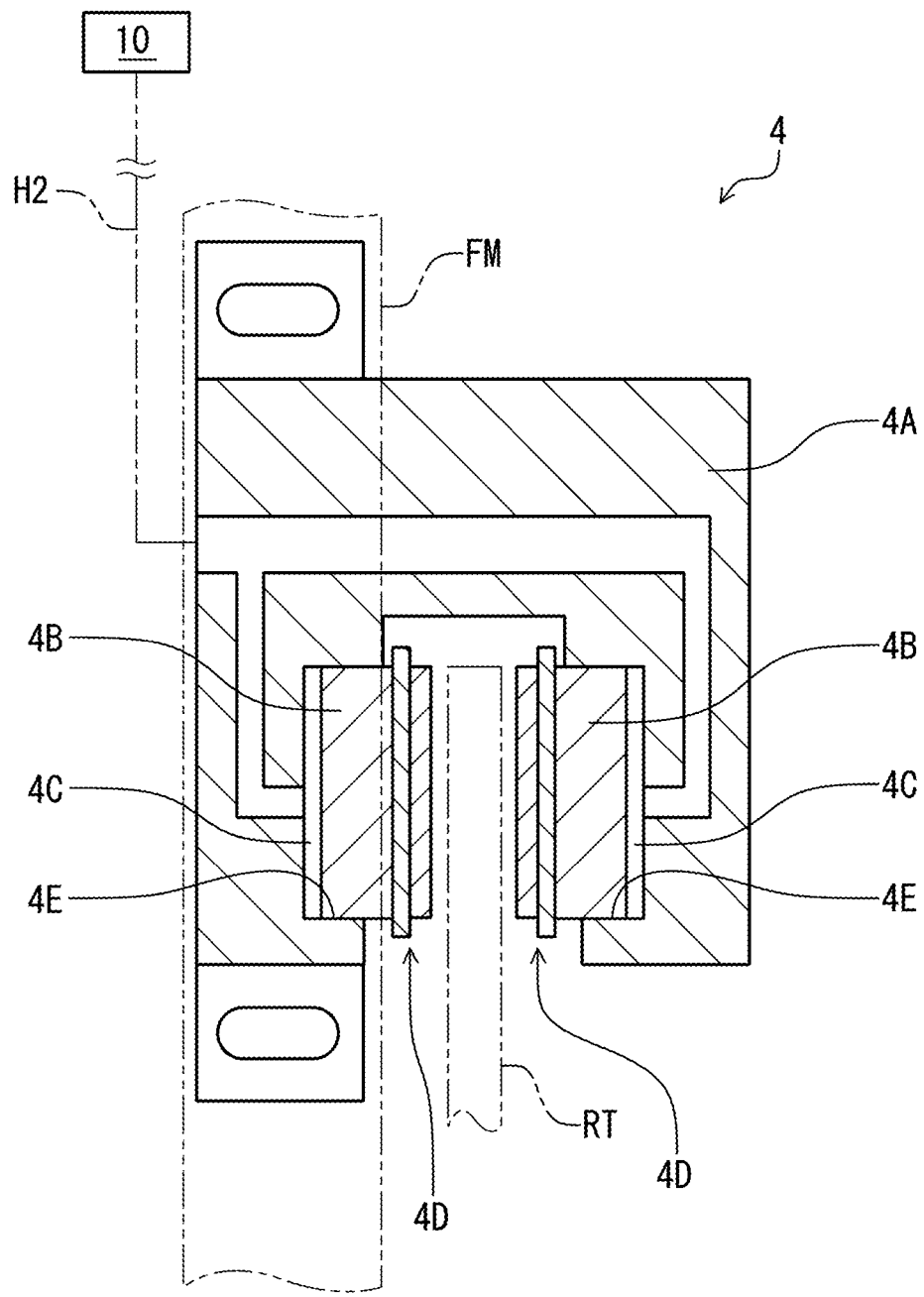
FIG. 3 is a cross-sectional view of the hydraulic operated device of the human-powered vehicle illustrated in FIG. 1.

As seen in FIG. 3, the hydraulic operated device 4 includes a caliper body 4A, a pair of slave pistons 4B, a pair of slave chambers 4C, a pair of friction members 4D. The caliper body 4A includes a pair of slave cylinder bores 4E and is secured to a frame FM. The slave piston 4B is movably provided in the slave cylinder bore 4E. The slave piston 4B and the slave cylinder bore 4E define the slave chamber 4C. The friction member 4D is movably attached to the caliper body 4A. The slave piston 4B presses the friction member 4D toward a disc brake rotor RT in response to a hydraulic pressure transmitted to the slave chamber 4C. The pair of slave chambers 4C is in fluid communication with the hydraulic operating device 10 with the second hydraulic hose H2.

Figure 4:
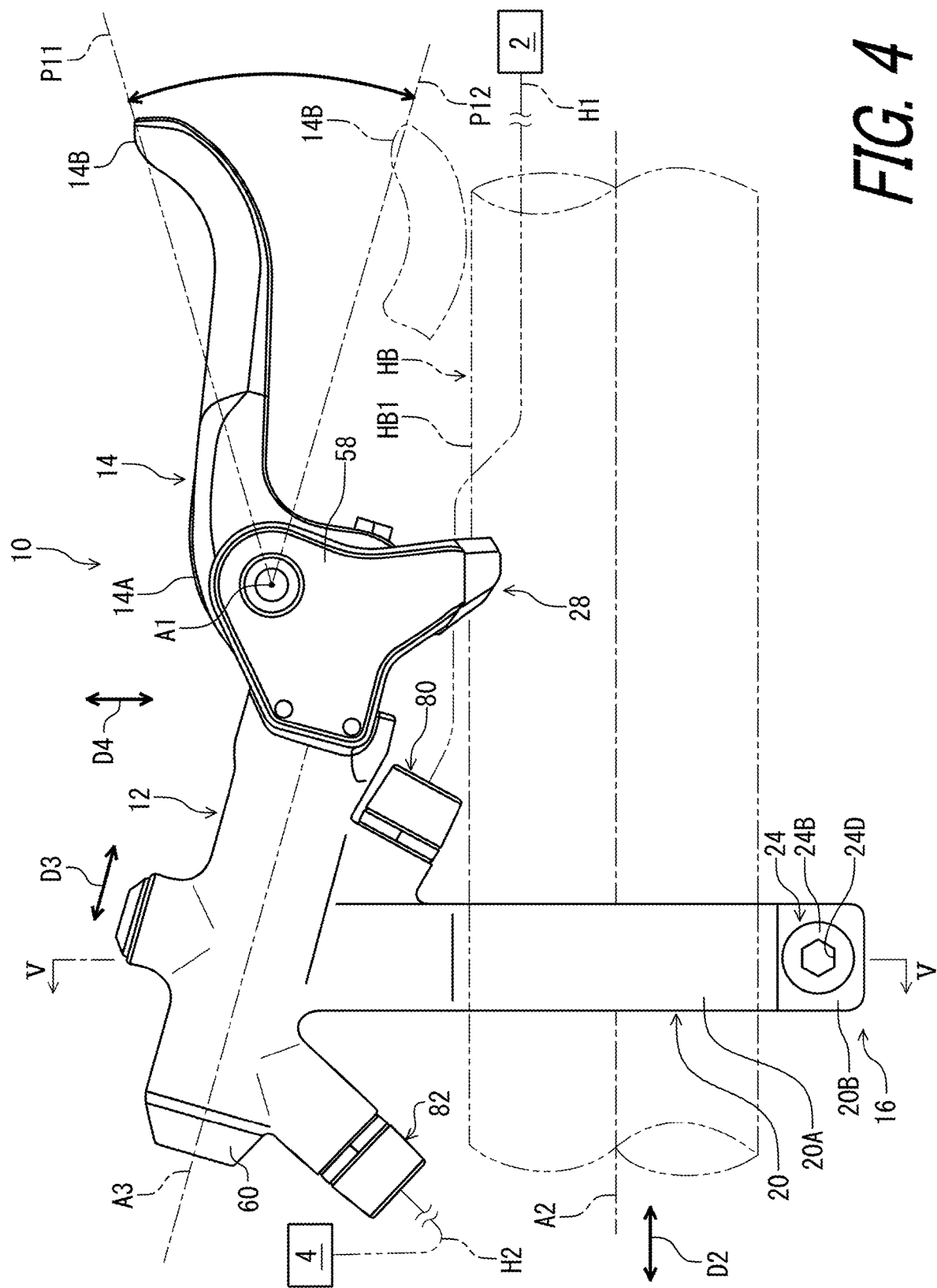
FIG. 4 is a top view of the hydraulic operating device of the human-powered vehicle illustrated in FIG. 1.

As seen in FIG. 4, the hydraulic operating device 10 comprises a base member 12 and an operating member 14. The operating member 14 is pivotally coupled to the base member 12 about a pivot axis A1. The operating member 14 is provided as a lever in this embodiment. The operating member 14 includes a proximal end portion 14A and a distal end portion 14B opposite to the proximal end portion 14A. The operating member 14 is pivotally coupled to the base member 12 at the proximal end portion 14A about the pivot axis A1. The operating member 14 extends from the proximal end portion 14A to the distal end portion 14B. The distal end portion 14B constitutes a free end of the operating member 14. A pivot axis direction D1 is defined to be parallel to the pivot axis A1. The operating member 14 is pivotable relative to the base member 12 about the pivot axis A1 from a rest position P11 to an operated position P12.

In the present application, the term "rest position" as used herein refers to a position at which a movable part such as the operating member 14 remains stationary in a state where the movable part is not operated by the user. The term "operated position" as used herein refers to a position at which the movable part has been operated by the user to perform the operation of the hydraulic operated device 4.

Figure 5:
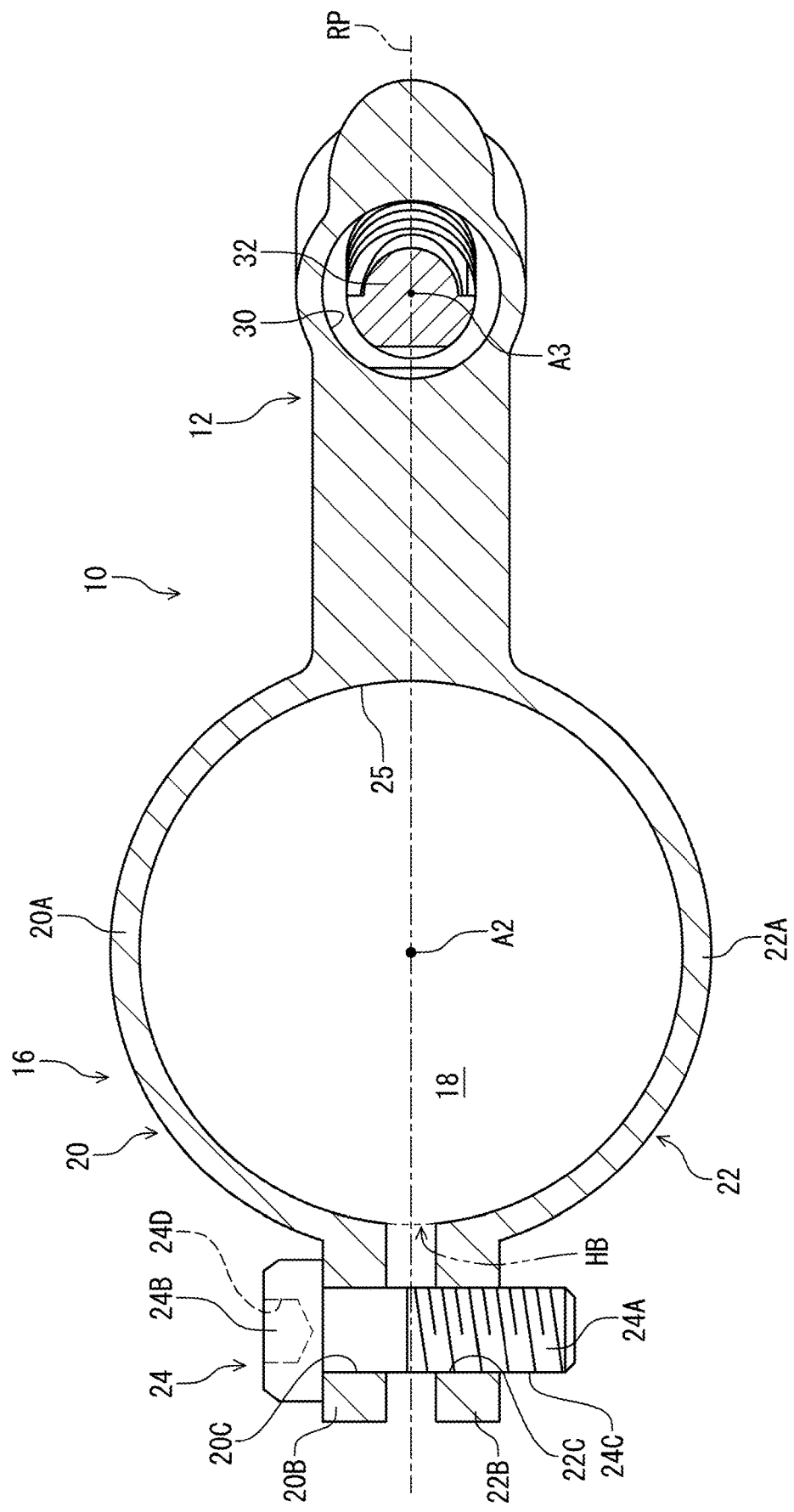
FIG. 5 is a cross-sectional view of the hydraulic operating device taken along line V-V of FIG. 4.

As seen in FIG. 5, the hydraulic operating device 10 comprises a mounting member 16. The mounting member 16 is configured to couple the base member 12 to the handlebar HB. The mounting member 16 includes a mount opening 18 through which the handlebar HB is to extend. The mount opening 18 has a mount center axis A2. As seen in FIG. 4, the straight part HB1 of the handlebar HB has a longitudinal center axis HB3. The mount center axis A2 is coincident with the longitudinal center axis HB3 as the mounting member 16 couples the base member 12 to the handlebar HB.

As seen in FIG. 5, in this embodiment, the mounting member 16 includes a first clamp band 20, a second clamp band 22, and a clamp bolt 24. The first clamp band 20 is coupled to the base member 12. The second clamp band 22 is coupled to the base member 12. The first clamp band 20 includes a first curved part 20A and a first band end portion 20B. The first curved part 20A extends from the base member 12 along an outer circumferential surface of the handlebar HB. The first band end portion 20B is provided at an end of the first curved part 20A. The second clamp band 22 includes a second curved part 22A and a second band end portion 22B. The second curved part 22A extends from the base member 12 along the outer circumferential surface of the handlebar HB. The second band end portion 22B is provided at an end of the second curved part 22A. The clamp bolt 24 couples the first band end portion 20B to the second band end portion 22B to change a distance between the first band end portion 20B and the second band end portion 22B.

Each of the first clamp band 20 and the second clamp band 22 is made of a deformable material. In this embodiment, each of the first clamp band 20 and the second clamp band 22 is made of a thin metallic material, e.g., steel, stainless steel, or aluminum alloy. Each of the first clamp band 20 and the second clamp band 22 is integrally provided with the base member 12. However, at least one of the first clamp band 20 and the second clamp band 22 can be a separate member from the base member 12. The material of each of the first clamp band 20 and the second clamp band 22 is not limited to this embodiment.

The base member 12 includes a mounting contact surface 25. The mounting contact surface 25 has a curved shape extending along the outer circumferential surface of the handlebar HB. The first clamp band 20, the second clamp band 22, and the mounting contact surface 25 define the mount opening 18. The clamp bolt 24 includes a rod 24A and a bolt head 24B provided at an end of the rod 24A. The rod 24A includes an external thread 24C. The first band end portion 20B includes a through-hole 20C. The second band end portion 22B includes a clamp threaded hole 22C. The rod 24A extends through the through-hole 20C. The external thread 24C is threadedly engaged with the clamp threaded hole 22C. The bolt head 24B includes a tool engagement part 24D such as a hexagon socket.

As seen in FIG. 4, the base member 12 includes a support portion 28. The support portion 28 is configured to contact the outer circumferential surface of the handlebar HB without clamping the handlebar HB in a mounting state where the handlebar HB extends through the mount opening 18 of the mounting member 16. The support portion 28 is provided between the mounting member 16 and the distal end portion 14B of the operating member 14 in a mount axis direction D2 parallel to the mount center axis A2. The first clamp band 20 and the second clamp band 22 are symmetrical with respect to each other as seen in the mount axis direction D2. Retuning to FIG. 4, the support portion 28 is spaced apart from the mounting member 16 in the mount axis direction D2 parallel to the mount center axis A2. However, the location of the support portion 28 is not limited to this embodiment. The support portion 28 can be omitted from the base member 12.

The support portion 28 is provided between the mounting member 16 and the distal end portion 14B of the operating member 14 in the mount axis direction D2 in a rest state where the operating member 14 is in the rest position P11. The support portion 28 is provided between the mounting member 16 and the distal end portion 14B of the operating member 14 in the mount axis direction D2 in an operated state where the operating member 14 is in the operated position P12.

Figure 6:
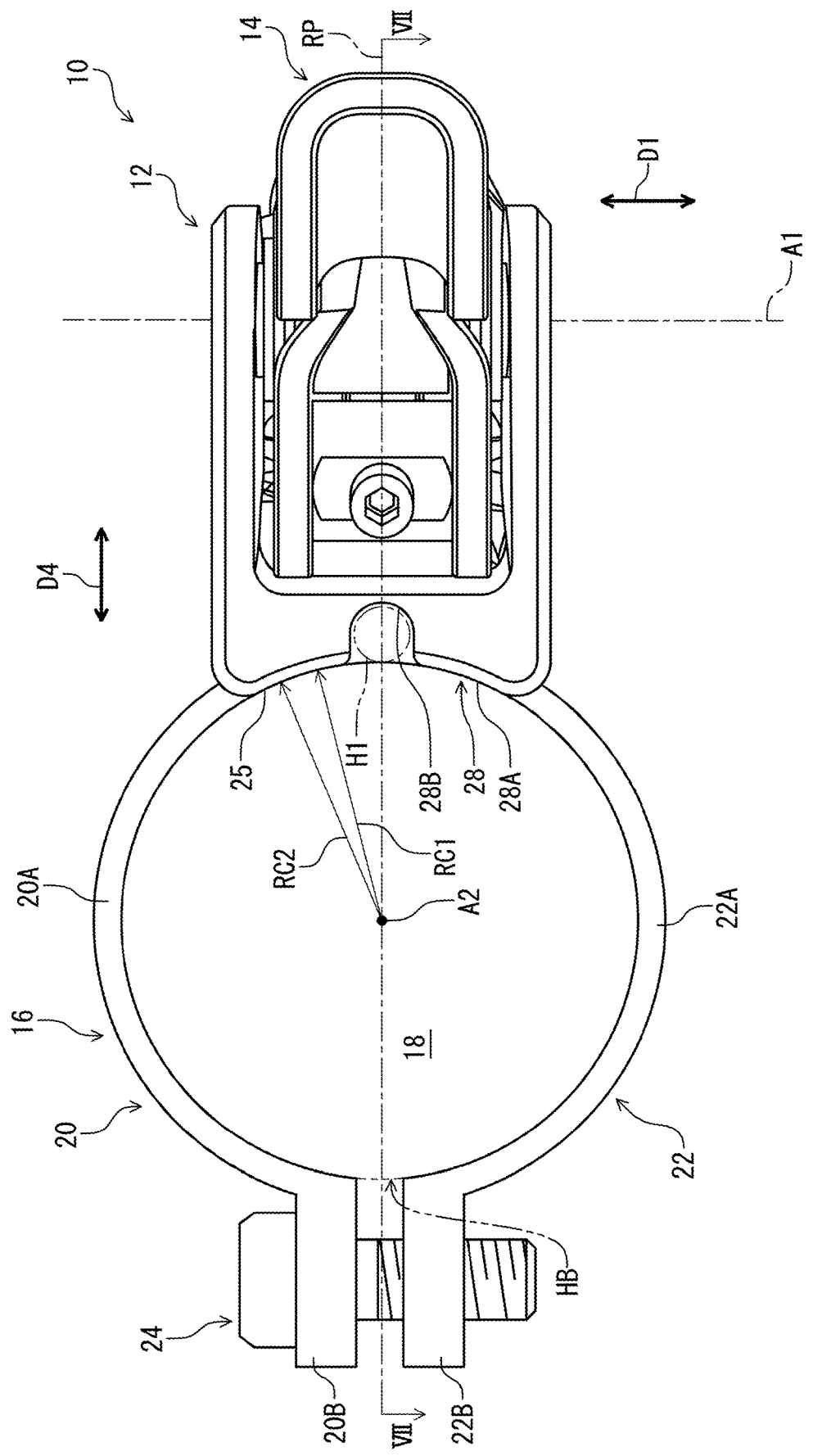
FIG. 6 is a side elevational view of the hydraulic operating device of the human-powered vehicle illustrated in FIG. 1.

As seen in FIG. 6, the support portion 28 includes a support contact surface 28A. The support contact surface 28A has a curved shape extending along the outer circumferential surface of the handlebar HB. The support contact surface 28A has a radius of curvature RC1 equal to a radius of curvature RC2 of the mounting contact surface 25. However, the radius of curvature RC1 of the support contact surface 28A can be different from the radius of curvature RC2 of the mounting contact surface 25. Further, the support contact surface 28A can be offset form the mounting contact surface 25 in the radial direction of the mount opening 18 as viewed along the mount center axis A2

Figure 7:
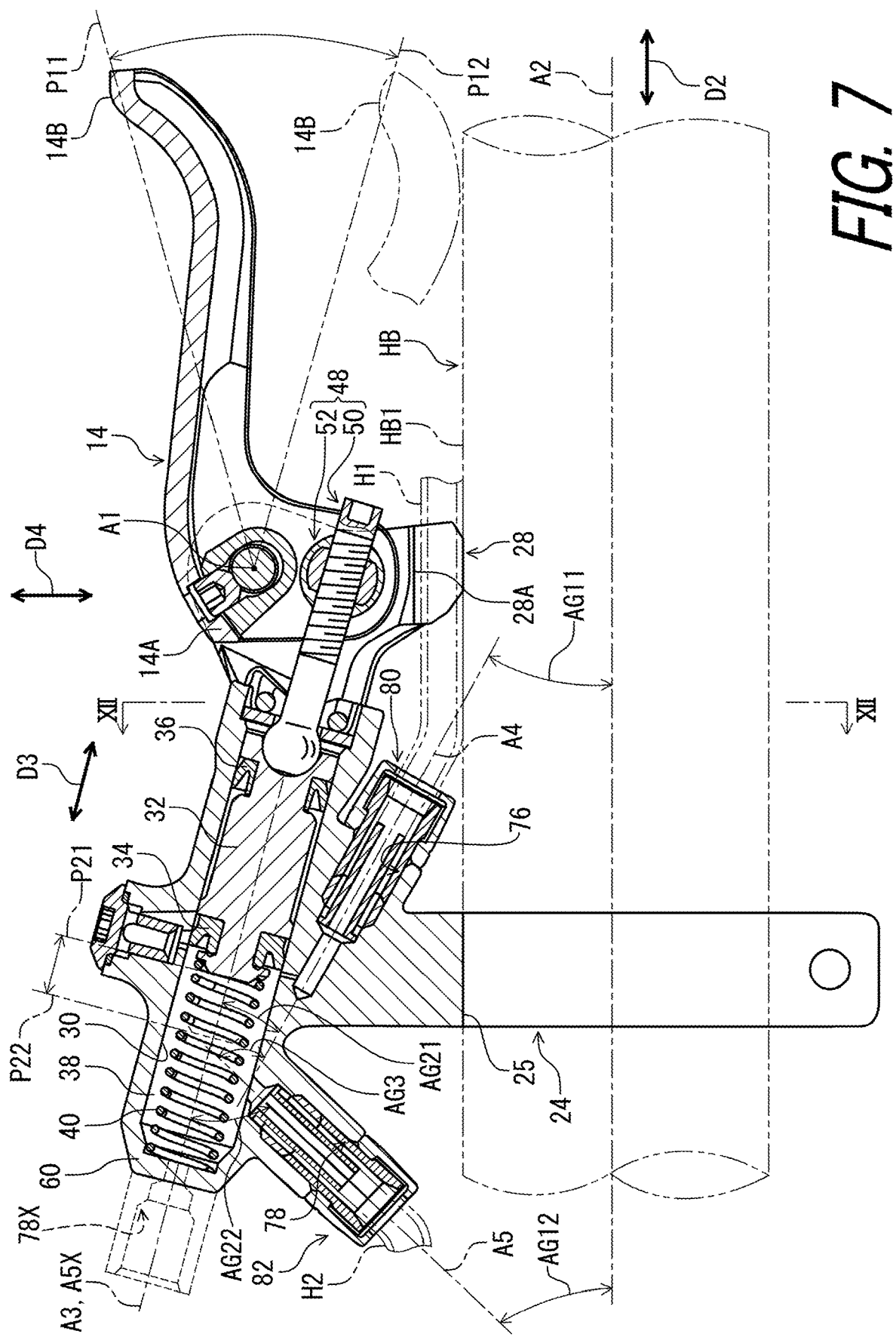
FIG. 7 is a cross-sectional view of the hydraulic operating device taken along line VII-VII of FIG. 6.

As seen in FIG. 7, the base member 12 includes a cylinder bore 30. The cylinder bore 30 has a cylinder center axis A3. The cylinder bore 30 extends along the cylinder center axis A3. The hydraulic operating device 10 comprises a piston 32. The piston 32 is movably provided in the cylinder bore 30 and is operatively coupled to the operating member 14 to move relative to the base member 12 in response to a pivotal movement of the operating member 14.

The piston 32 is movable relative to the base member 12 between an initial position P21 and an actuated position P22. The piston 32 is in the initial position P21 in the rest state where the operating member 14 is in the rest position P11. The piston 32 is in the actuated position P22 in the operated state where the operating member 14 is in the operated position P12.

Figure 8:
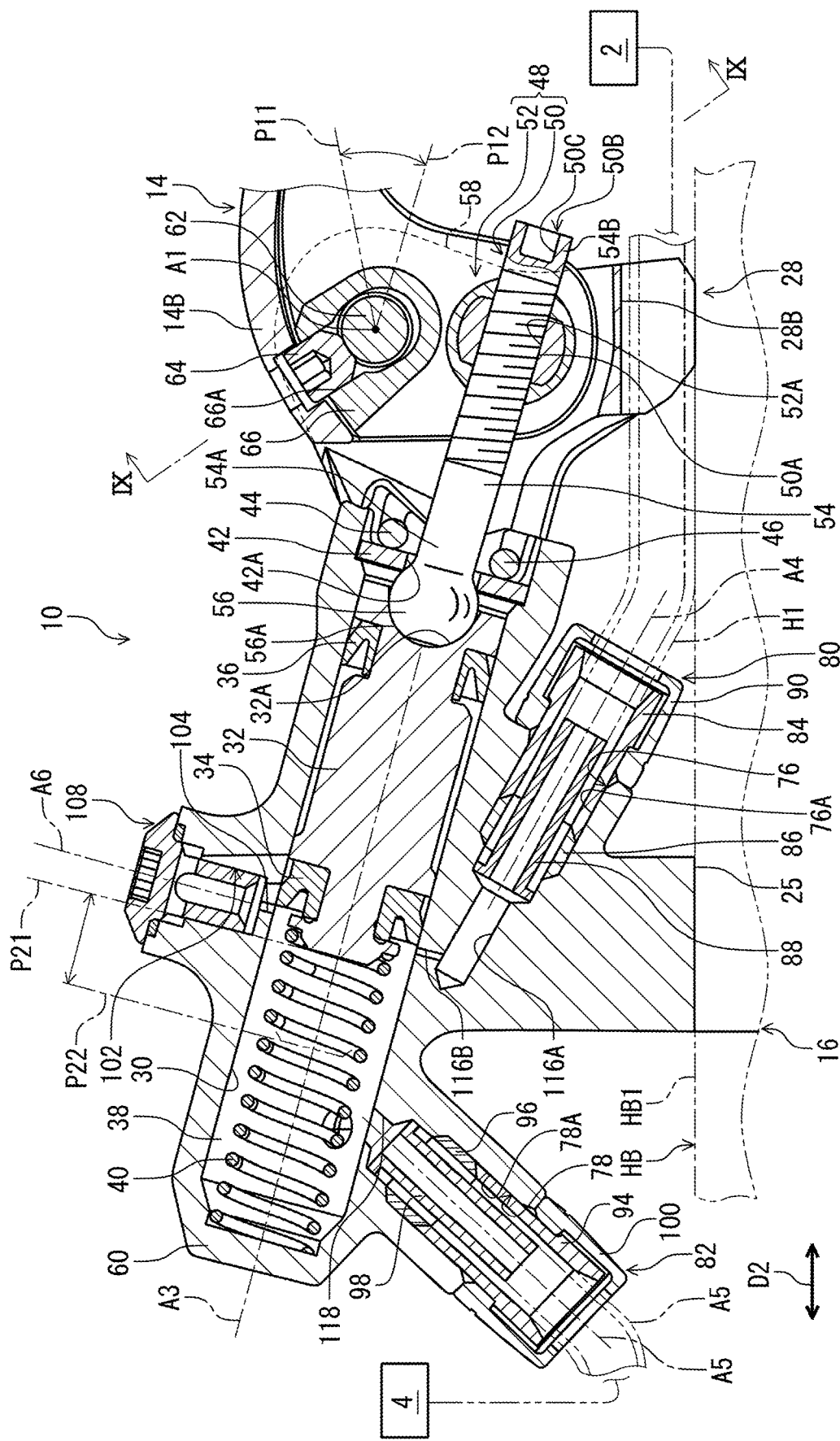
FIG. 8 is a partial enlarged cross-sectional view of the hydraulic operating device illustrated in FIG. 7.

As seen in FIG. 8, the hydraulic operating device 10 comprises a first seal member 34 and a second seal member 36. The first seal member 34 and the second seal member 36 are attached to the piston 32. The piston 32, the first seal member 34, and the cylinder bore 30 define a hydraulic chamber 38. The piston 32, the first seal member 34, the second seal member 36 and the cylinder bore 30 define an additional hydraulic chamber 39.

The hydraulic operating device 10 comprises a piston biasing member 40, a lid 42, a first stopper 44, and a second stopper 46. The piston biasing member 40 is provided in the hydraulic chamber 38 to bias the piston 32 toward the initial position P21. The lid 42 is attached to the base member 12. The first stopper 44 is provided as a pin. The second stopper 46 is provided as a pin. The first stopper 44 and the second stopper 46 are secured to the base member 12. The first stopper 44 and the second stopper 46 position the lid 42 on the base member 12.

In this embodiment, the hydraulic operating device 10 further comprises an adjustment structure 48 configured to adjust the rest position P11 of the operating member 14 with respect to the base member 12. The adjustment structure 48 operatively couples the operating member 14 to the piston 32. The adjustment structure 48 includes a piston rod 50 and a coupling member 52. The piston rod 50 is rotatably and pivotally coupled to the piston 32. The piston rod 50 extends through an opening 42A of the lid 42.

The piston 32 includes a recess 32A. The piston rod 50 includes a rod body 54 and a joint 56. The rod body 54 includes a first rod end 54A and a second rod end 54B opposite to the first rod end 54A. The joint 56 is provided at the first rod end 54A and has a spherical surface 56A. The joint 56 is provided in the recess 32A of the piston 32.

The joint 56 is in contact with the lid 42 in an initial state where the piston 32 is in the initial position P21. A biasing force of the piston biasing member 40 keeps the piston 32 in the initial position P21 in the rest state of the operating member 14.

The coupling member 52 is rotatably coupled to the operating member 14. The coupling member 52 includes a threaded hole 52A. The piston rod 50 includes an externally threaded portion 50A provided on the rod body 54. The externally threaded portion 50A is threadedly engaged with the threaded hole 52A. The piston rod 50 includes a tool engagement part 50B provided at the second rod end 54B. For example, the tool engagement part includes a hexagonal hole 50C. Rotation of the piston rod 50 relative to the coupling member 52 changes a distance between the piston 32 and the coupling member 52, changing the rest position P11 of the operating member 14.

The base member 12 includes a first end portion 58 and a second end portion 60. The second end portion 60 is opposite to the first end portion 58. The operating member 14 is pivotally coupled to the base member 12 at the first end portion 58 about the pivot axis A1. The cylinder bore 30 is provided at least partly between the first end portion 58 and the second end portion 60. In this embodiment, the cylinder bore 30 is entirely provided between the first end portion 58 and the second end portion 60. However, the cylinder bore 30 can be partly provided between the first end portion 58 and the second end portion 60.

The hydraulic operating device 10 comprises a pivot pin 62, a lock screw 64, and a screw holder 66. The pivot pin 62 is attached to the base member 12 to pivotally couple the operating member 14 to the base member 12. The pivot pin 62 defines the pivot axis A1. The lock screw 64 is attached to the screw holder 66 to position the pivot pin 62 on the base member 12. The screw holder 66 includes a lock threaded hole 66A. The lock screw 64 is threadedly engaged in the lock threaded hole 66A.

Figure 9:
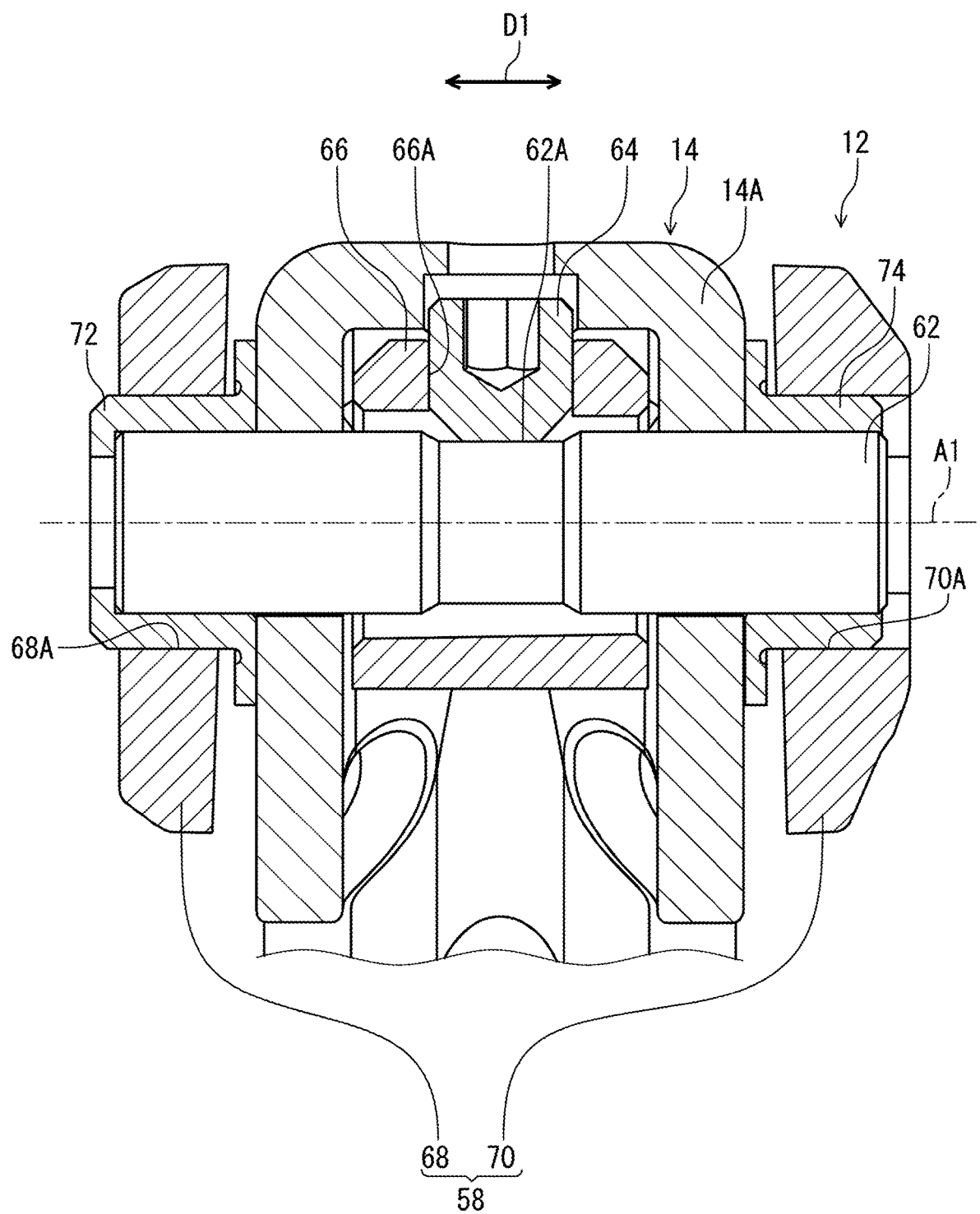
FIG. 9 is a cross-sectional view of the hydraulic operating device taken along line IX-IX of FIG. 8.

As seen in FIG. 9, the pivot pin 62 includes an annular groove 62A. The lock screw 64 is partly provided in the annular groove 62A extending about the pivot axis A1. The base member 12 includes a first support 68 and a second support 70. The second support 70 is spaced apart from the first support 68 in the pivot axis direction D1 parallel to the pivot axis A1. The first support 68 and the second support 70 constitute the first end portion 58 of the base member 12. The proximal end portion 14A of the operating member 14 is provided between the first support 68 and the second support 70 in the pivot axis direction D1.

The first support 68 includes a first pivot hole 68A. The second support 70 includes a second pivot hole 70A. The pivot pin 62 extends through the first pivot hole 68A and the second pivot hole 70A. The hydraulic operating device 10 comprises a first bushing 72 and a second bushing 74. The first bushing 72 is provided in the first pivot hole 68A. The second bushing 74 is provided in the second pivot hole 70A. The first bushing 72 is provided in the first pivot hole 68A. The second bushing 74 is provided in the second pivot hole 70A. The first bushing 72 is provided between the pivot pin 62 and the first support 68. The second bushing 74 is provided between the pivot pin 62 and the second support 70.

As seen in FIG. 8, the base member 12 includes a first hose-attachment hole 76 and a second hose-attachment hole 78. The first hose-attachment hole 76 is configured to be in fluid communication with the cylinder bore 30. The second hose-attachment hole 78 is configured to be in fluid communication with the cylinder bore 30. In this embodiment, the first hose-attachment hole 76 is configured to be connected to the additional hydraulic operating device 2. The second hose-attachment hole 78 is configured to be connected to the hydraulic operated device 4. However, the first hose-attachment hole 76 can be configured to be connected to another hydraulic device such as the hydraulic operated device 4. The second hose-attachment hole 78 can be configured to be connected to another hydraulic device such as the additional hydraulic operating device 2.

The hydraulic operating device 10 further comprises a first hose connector 80 and a second hose connector 82. The first hose connector 80 is configured to connect the first hydraulic hose H1 to the first hose-attachment hole 76. The second hose connector 82 is configured to connect the second hydraulic hose H2 to the second hose-attachment hole 78.

The first hose-attachment hole 76 includes a first threaded hole 76A. The first hose connector 80 includes a first threaded fastening sleeve 84 threadedly engaged with the first threaded hole 76A. The first hose connector 80 includes a first tubular bushing 86 through which the first hydraulic hose H1 is to pass in the first hose-attachment hole 76. The first tubular bushing 86 is configured to be deformed during installation of the first threaded fastening sleeve 84 to the first threaded hole 76A. The first hose connector 80 includes a first insertion 88 and a first cover 90. The first insertion 88 is configured to be provided in an end of the first hydraulic hose H1. In accordance with a deformation of the first tubular bushing 86, the first tubular bushing 86 catches the end of the first hydraulic hose H1 to position the end of the first hydraulic hose H1 with respect to the base member 12. The first cover 90 is attached to the first threaded fastening sleeve 84 to at least partly cover (in this embodiment, entirely cover) the first threaded fastening sleeve 84. However, the first hose connector 80 can include a banjo and a banjo bolt while the first hose connector 80 is a straight-type connector.

The second hose-attachment hole 78 includes a second threaded hole 78A. The second hose connector 82 includes a second threaded fastening sleeve 94 threadedly engaged with the second threaded hole 78A. The second hose connector 82 includes a second tubular bushing 96 through which the second hydraulic hose H2 is to pass in the second hose-attachment hole 78. The second tubular bushing 96 is configured to be deformed during installation of the second threaded fastening sleeve 94 to the second threaded hole 78A. The second hose connector 82 includes a second insertion 98 and a second cover 100. The second insertion 98 is configured to be provided in an end of the second hydraulic hose H2. In accordance with a deformation of the second tubular bushing 96, the second tubular bushing 96 catches the end of the second hydraulic hose H2 to position the end of the second hydraulic hose H2 with respect to the base member 12. The second cover 100 is attached to the second threaded fastening sleeve 94 to at least partly cover (in this embodiment, entirely cover) the second threaded fastening sleeve 94. However, the second hose connector 82 can include a banjo and a banjo bolt while the second hose connector 82 is a straight-type connector.

As seen in FIG. 8, the first hose-attachment hole 76 has a first center axis A4. The second hose-attachment hole 78 has a second center axis A5. The first hose-attachment hole 76 faces in a direction parallel to the first center axis A4. The second hose-attachment hole 78 faces in a direction parallel to the second center axis A5. The first center axis A4 is non-parallel to the second center axis A5 as viewed along the pivot axis A1. The first center axis A4 is non-perpendicular to the second center axis A5 as viewed along the pivot axis A1. However, the first center axis A4 can be parallel to the second center axis A5 as viewed along the pivot axis A1. The first center axis A4 can be perpendicular to the second center axis A5 as viewed along the pivot axis A1.

As seen in FIG. 7, the first center axis A4 is non-parallel to the mount center axis A2. The second center axis A5 is non-parallel to the mount center axis A2. The first center axis A4 is non-parallel to a cylinder axis direction D3 parallel to the cylinder center axis A3. The second center axis A5 is non-parallel to the cylinder axis direction D3. The first center axis A4 is non-perpendicular to the cylinder axis direction D3. The second center axis A5 is non-perpendicular to the cylinder axis direction D3.

However, the first center axis A4 can be parallel to the mount center axis A2. The second center axis A5 can be parallel to the mount center axis A2. The first center axis A4 can be parallel to a cylinder axis direction D3 parallel to the cylinder center axis A3. The second center axis A5 can be parallel to the cylinder axis direction D3. The first center axis A4 can be perpendicular to the cylinder axis direction D3. The second center axis A5 can be perpendicular to the cylinder axis direction D3.

The cylinder center axis A3 is non-perpendicular to the mount center axis A2 as viewed along the pivot axis A1. The cylinder center axis A3 is non-parallel to the mount center axis A2 as viewed along the pivot axis A1. However, the cylinder center axis A3 can be perpendicular to the mount center axis A2 as viewed along the pivot axis A1. The cylinder center axis A3 can be parallel to the mount center axis A2 as viewed along the pivot axis A1.

At least one of the first hose-attachment hole 76 and the second hose-attachment hole 78 faces toward the mount center axis A2 of the mount opening 18 as viewed along the pivot axis A1. In this embodiment, both the first hose-attachment hole 76 and the second hose-attachment hole 78 faces toward the mount center axis A2 of the mount opening 18 as viewed along the pivot axis A1. However, only one of the first hose-attachment hole 76 and the second hose-attachment hole 78 can face toward the mount center axis A2 of the mount opening 18 as viewed along the pivot axis A1. In such embodiments, the other of the first hose-attachment hole 76 and the second hose-attachment hole 78 faces in the mount axis direction D2 as viewed along the pivot axis A1 or toward an opposite side of the mount center axis A2 of the mount opening 18 as viewed along the pivot axis A1.

The first hose-attachment hole 76 is provided between the mounting member 16 and the support portion 28 in the mount axis direction D2 as viewed along the pivot axis A1. The mounting member 16 and first hose-attachment hole 76 are provided between the second hose-attachment hole 78 and the support portion 28 in the mount axis direction D2 as viewed along the pivot axis A1. The support portion 28 is closer to the mount center axis A2 than the first hose-attachment hole 76 and the second hose-attachment hole 78 as viewed along the pivot axis A1. The first hose-attachment hole 76 faces toward the support portion 28 as viewed along the pivot axis A1.

However, the positional relationship among the first hose-attachment hole 76, the second hose-attachment hole 78, the mounting member 16, the support portion 28, and the mount center axis A2 is not limited to this embodiment. The first hose-attachment hole 76 can be provided at a position other than between the mounting member 16 and the support portion 28 in the mount axis direction D2 as viewed along the pivot axis A1. The mounting member 16 and first hose-attachment hole 76 can be provided at a position other than between the second hose-attachment hole 78 and the support portion 28 in the mount axis direction D2 as viewed along the pivot axis A1. The support portion 28 can be farther from the mount center axis A2 than the first hose-attachment hole 76 and the second hose-attachment hole 78 as viewed along the pivot axis A1. The first hose-attachment hole 76 can face in another direction as viewed along the pivot axis A1. Concretely, for example, the second hose-attachment hole 78 can be provided as a second hose-attachment hole 78X shown with dotted lines in FIG. 7. The second hose-attachment hole 78X has the same construction as the second hose attachment hole 78. In this case, the second hose-attachment hole 78X is provided on the second end portion 60, and a second center axis A5X of the second hose-attachment hole 78X is coaxial with the cylinder center axis A3.

The mounting member 16 is provided between the first hose-attachment hole 76 and the second hose-attachment hole 78 in the mount axis direction D2 parallel to the mount center axis A2 as viewed along the pivot axis A1. However, the mounting member 16 can be provided at a position other than between the first hose-attachment hole 76 and the second hose-attachment hole 78 in the mount axis direction D2 parallel to the mount center axis A2 as viewed along the pivot axis A1. The first hose-attachment hole 76 can be provided at a position other than between the mount opening 18 and the second hose-attachment hole 78 in a perpendicular direction D4 perpendicular to both the pivot axis A1 and the mount center axis A2 as viewed along the pivot axis A1.

The first hose-attachment hole 76 is provided between the pivot axis A1 and the second hose-attachment hole 78 in the mount axis direction D2 parallel to the mount center axis A2. However, the first hose-attachment hole 76 can be provided at a position other than between the pivot axis A1 and the second hose-attachment hole 78 in the mount axis direction D2.

The first hose-attachment hole 76 and the second hose-attachment hole 78 are closer to the mount center axis A2 than the pivot axis A1 in the perpendicular direction D4 perpendicular to both the pivot axis A1 and the mount center axis A2. The first hose-attachment hole 76 and the second hose-attachment hole 78 are provided between the pivot axis A1 and the mount center axis A2 in the perpendicular direction D4 perpendicular to both the pivot axis A1 and the mount center axis A2.

However, the first hose-attachment hole 76 and the second hose-attachment hole 78 can be farther from the mount center axis A2 than the pivot axis A1 in the perpendicular direction D4. The first hose-attachment hole 76 and the second hose-attachment hole 78 can be provided at a position other than between the pivot axis A1 and the mount center axis A2 in the perpendicular direction D4.

As seen in FIG. 7, a first hole angle AG11 is defined between the mount center axis A2 and the first center axis A4 as viewed along the pivot axis A1. A second hole angle AG12 is defined between the mount center axis A2 and the second center axis A5 as viewed along the pivot axis A1. The first hole angle AG11 is different from the second hole angle AG12. The first hole angle AG11 is smaller than the second hole angle AG12. However, the first hole angle AG11 can be equal to or larger than the second hole angle AG12.

A first angle AG21 is defined between the cylinder center axis A3 and the first center axis A4 as viewed along the pivot axis A1. A second angle AG22 is defined between the cylinder center axis A3 and the second center axis A5 as viewed along the pivot axis A1. The first angle AG21 is different from the second angle AG22. The first angle AG21 is smaller than the second angle AG22. However, the first angle AG21 can be equal to or larger than the second angle AG22.

An intermediate angle AG3 is defined between the first center axis A4 and the second center axis A5 as viewed along the pivot axis A1 The intermediate angle AG3 is larger than the first hole angle AG11, the first angle AG21, and the second angle AG22. The intermediate angle AG3 is smaller than the second hole angle AG12. However, the intermediate angle AG3 can be equal to or smaller than at least one of the first hole angle AG11, the first angle AG21, and the second angle AG22. The intermediate angle AG3 can be equal to or larger than the second hole angle AG12.

Figure 13:
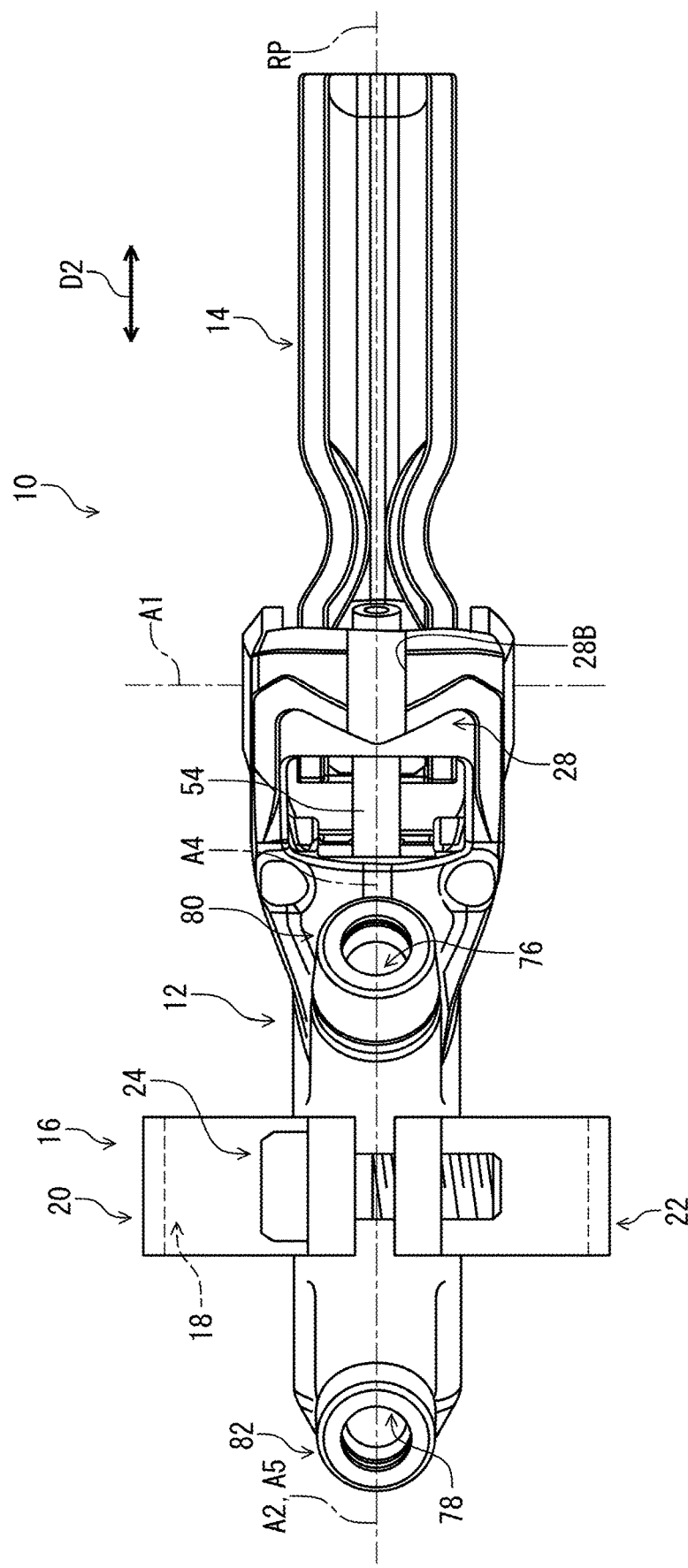
FIG. 13 is a rear view of the hydraulic operating device of the human-powered vehicle illustrated in FIG. 1.

As seen in FIG. 13, the first center axis A4 and the second center axis A5 are perpendicular to the pivot axis A1 as viewed in the perpendicular direction D4 perpendicular to both the pivot axis A1 and the mount center axis A2.

The first center axis A4 defines a first orientation with respect to the pivot axis A1 as viewed in the perpendicular direction D4. The second center axis A5 defines a second orientation with respect to the pivot axis A1 as viewed in the perpendicular direction D4. In this embodiment, the first orientation is different from the second orientation. However, the first orientation can be identical to the second orientation with respect to the pivot axis A1 as viewed in the perpendicular direction D4.

As seen in FIG. 6, the support portion 28 includes a groove 28B through which the hydraulic hose H1 attached to one of the first hose-attachment hole 76 and the second hose-attachment hole 78 is to extend in the mounting state. In this embodiment, the hydraulic hose H1 attached to the first hose-attachment hole 76 extends through the groove 28B in the mounting state. However, the hydraulic hose H2 attached to the second hose-attachment hole 78 can extend through the groove 28B in the mounting state.

As seen in FIG. 8, the base member 12 includes an additional hole 102. The additional hole 102 is configured to be in fluid communication with the cylinder bore 30. The additional hole 102 includes an additional opening 103 having an additional center axis A6. The additional hole 102 is provided between the first hose-attachment hole 76 and the second hose-attachment hole 78 in the mount axis direction D2. The cylinder center axis A3 is provided between the first hose-attachment hole 76 and the additional hole 102 as viewed along the pivot axis A1. However, the position of the additional hole 102 is not limited to this embodiment.

Figure 10:
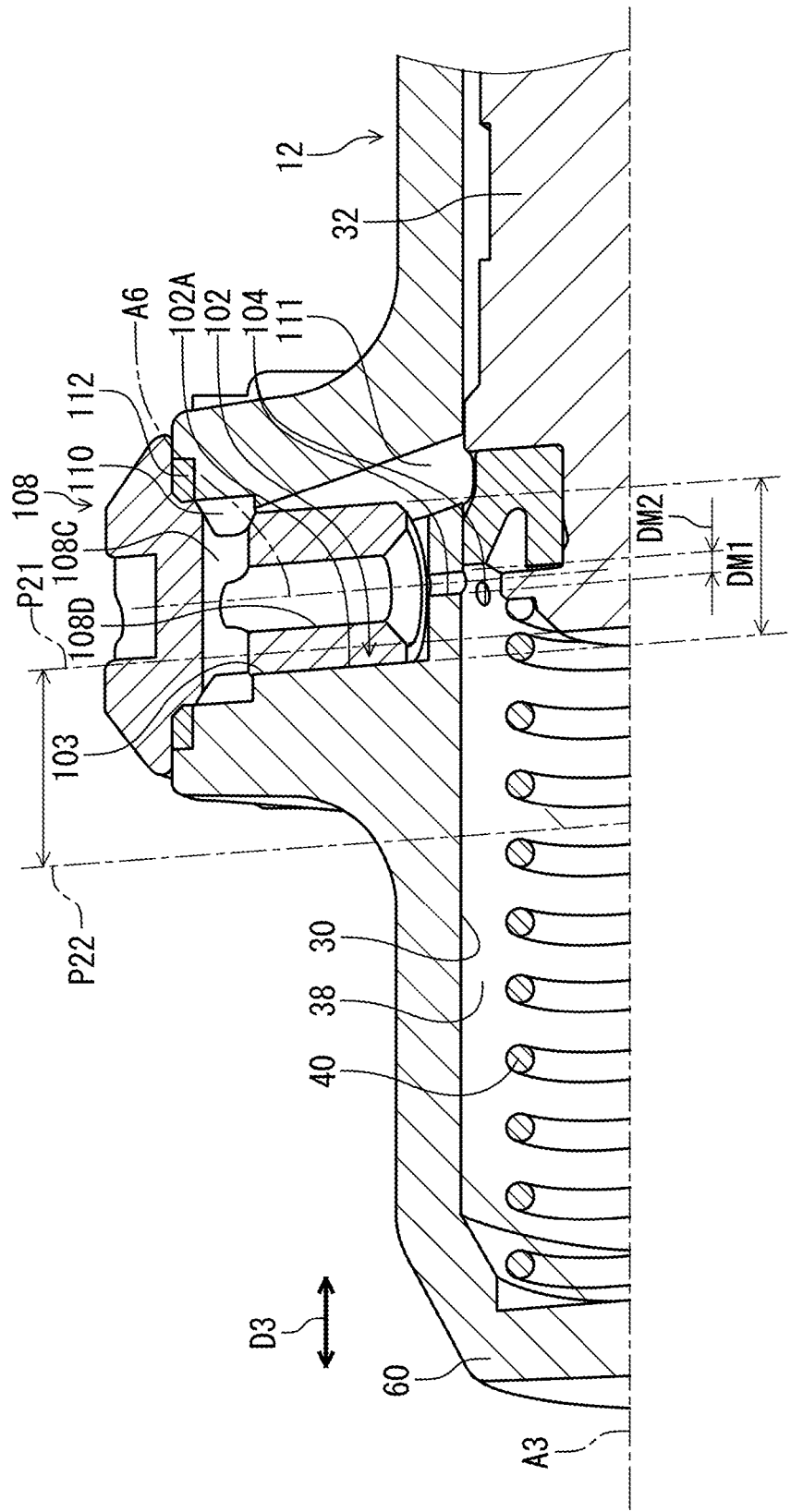
FIG. 10 is a partial enlarged perspective cross-sectional view around an additional opening of a base member in the hydraulic operating device.

As seen in FIG. 10, the base member 12 includes a connecting hole 104 connecting the additional hole 102 to the cylinder bore 30. In this embodiment, the base member 12 includes a plurality of connecting holes 104. However, a total number of the connecting holes 104 is not limited to this embodiment. The additional hole 102 has a first diameter DM1. The connecting hole 104 has a second diameter DM2 smaller than the first diameter DM1. However, the second diameter DM2 can be equal to or larger than the first diameter DM1.

The hydraulic operating device 10 further comprises a plug 108 threadedly engaged with the additional hole 102. The plug 108 includes a tubular part 108A and a head part 108B provided at an end of the tubular part 108A. The additional hole 102 includes an additional threaded hole 102A. The tubular part 108A is threadedly engaged with the additional threaded hole 102A. The tubular part 108A includes a first hole 108C and a second hole 108D connected to the first hole 108C. The base member 12 includes an annular recess 110 and an additional connecting hole 111. The additional connecting hole 111 is connected to the annular recess 110. The additional connecting hole 111 connects the additional hole 102 to the cylinder bore 30. The additional connecting hole 111 is provided on an opposite side of the connecting holes 104 with respect to the first seal member 34 in the cylinder axis direction D3 in the initial state of the piston 32. The hydraulic operating device 10 comprises a seal ring 112 provided between the plug 108 and the base member 12. The additional hole 102 can be used as a bleeding port.

As seen in FIG. 8, the base member 12 includes a first intermediate hole 116A and a second intermediate hole 116B. The first intermediate hole 116A is connected to the first hose-attachment hole 76. The second intermediate hole 116B connects the first intermediate hole 116A to the cylinder bore 30. Thus, the hydraulic chamber 38 of the hydraulic operating device 10 is in fluid communication with the master chamber 2D (FIG. 2) of the additional hydraulic operating device 2.

The base member 12 includes an intermediate hole 118. The intermediate hole 118 connects the second hose-attachment hole 78 to the cylinder bore 30. Thus, the hydraulic chamber 38 of the hydraulic operating device 10 is in fluid communication with the slave chamber 4C (FIG. 3) of the hydraulic operated device 4.

As seen in FIG. 8, the connecting holes 104 and the second intermediate hole 116B are provided between the first seal member 34 and the intermediate hole 118 in the cylinder axis direction D3 in the initial state of the piston 32. The second intermediate hole 116B and the intermediate hole 118 are in fluid communication with the hydraulic chamber 38 in the initial state of the piston 32. Thus, the hydraulic chamber 38 is in fluid communication with the master chamber 2D (FIG. 2) of the additional hydraulic operating device 2 and the slave chamber 4C (FIG. 3) of the hydraulic operated device 4 in the initial state of the piston 32. In this state, the hydraulic pressure generated by the additional hydraulic operating device 2 is transmitted from the master chamber 2D (FIG. 2) of the additional hydraulic operating device 2 to the slave chamber 4C (FIG. 3) of the hydraulic operated device 4 via the hydraulic chamber 38.

When the piston 32 moves from the initial position P21 toward the actuated position P22, the first seal member 34 passes through the second intermediate hole 116B, blocking the fluid communication between the second intermediate hole 116B and the hydraulic chamber 38. Thus, the hydraulic chamber 38 is in fluid communication with only the slave chamber 4C (FIG. 3) of the hydraulic operated device 4 in a state where the first seal member 34 blocks the fluid communication between the second intermediate hole 116B and the hydraulic chamber 38. In this state, the hydraulic pressure generated by the hydraulic operating device 10 is transmitted from the hydraulic chamber 38 to the slave chamber 4C (FIG. 3) of the hydraulic operated device 4 without being transmitted to the additional hydraulic operating device 2. Accordingly, the user can operate the hydraulic operated device 4 using the hydraulic operating device 10 or the additional hydraulic operating device 2.

Figure 11:
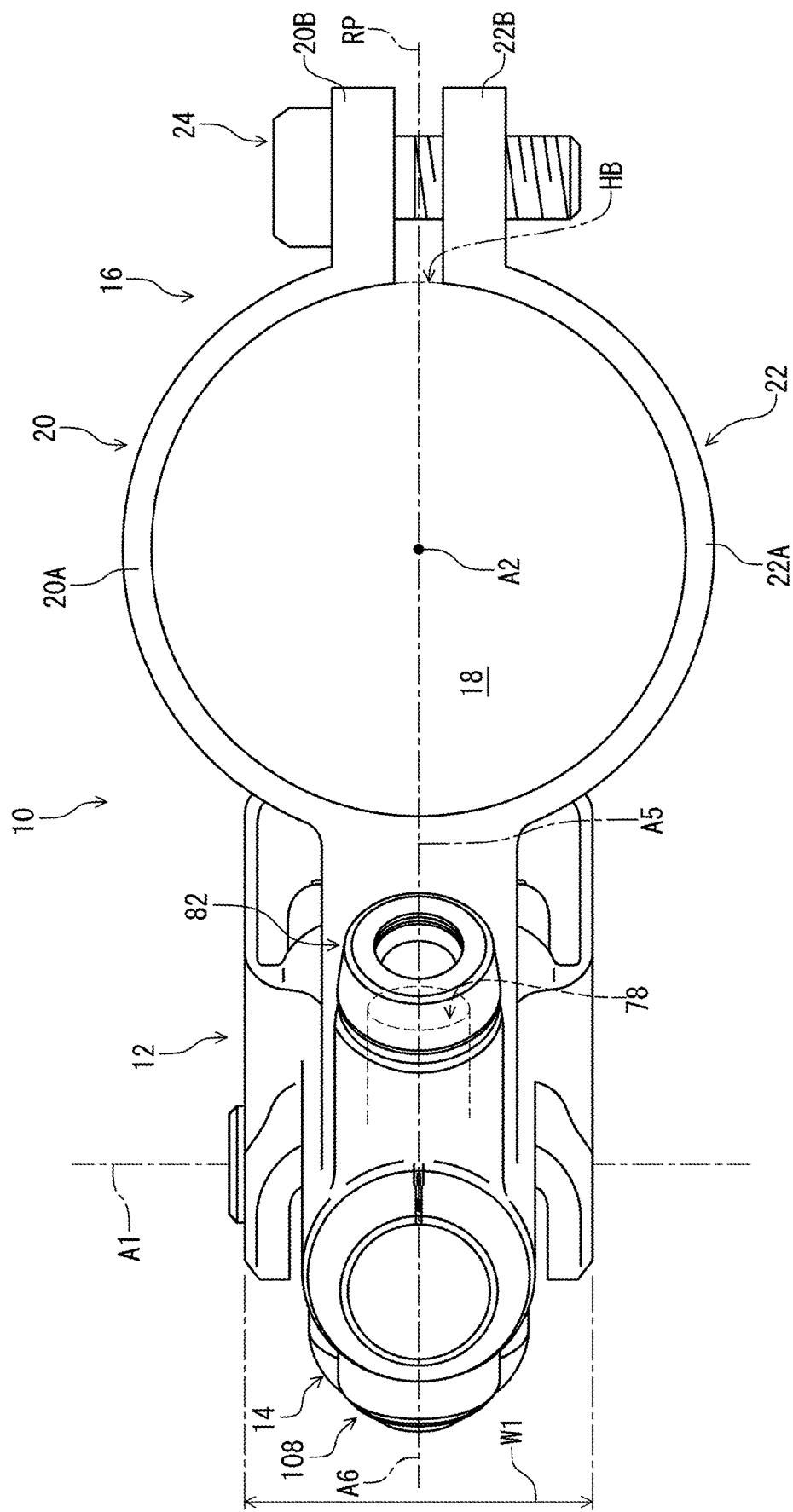
FIG. 11 is another side elevational view of the hydraulic operating device of the human-powered vehicle illustrated in FIG. 1.
Figure 12:
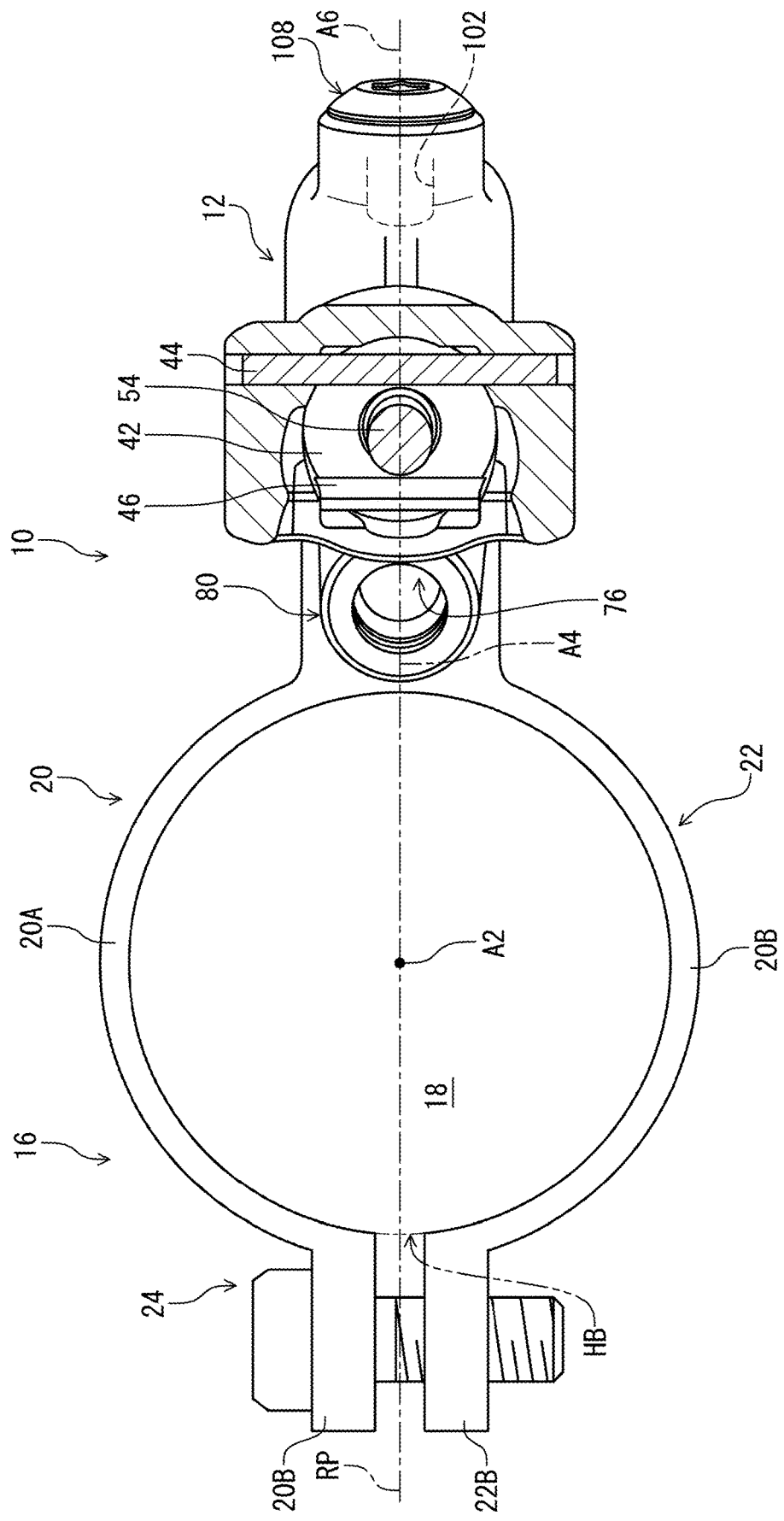
FIG. 12 is a cross-sectional view of the hydraulic operating device taken along line XII-XII of FIG. 7.

As seen in FIGS. 11 and 12, the first hose-attachment hole 76 (FIG. 11), the second hose-attachment hole 78 (FIG. 12), and the mount opening 18 are provided on a reference plane RP perpendicular to the pivot axis A1. The reference plane RP extends through the first hose-attachment hole 76 (FIG. 11), the second hose-attachment hole 78 (FIG. 12), and the mount opening 18 as viewed in a direction parallel to the reference plane RP.

As seen in FIG. 11, the base member 12 has a maximum axial width W1 defined in the pivot axis direction D1. The reference plane RP is defined to bisect the maximum axial width W1. Namely, the reference plane RP is defined at an axial center of the base member 12. However, the position of the reference plane RP is not limited to the axial center of the base member 12.

The second center axis A5 is included in the reference plane RP. The second center axis A5 is coincident with the reference plane RP as viewed in a direction which is parallel to the reference plane RP and which is different from a direction of the second center axis A5. However, the second center axis A5 does not need to be included in the reference plane RP. The second center axis A5 can be arranged to intersect or not to intersect with the reference plane RP.

The mount opening 18 has a symmetric shape relative to the reference plane RP. The first curved part 20A of the first clamp band 20 and the second curved part 22A of the second clamp band 22 have a symmetric shape with each other relative to the reference plane RP. However, the mount opening 18 can have an asymmetric shape relative to the reference plane RP. The first curved part 20A of the first clamp band 20 and the second curved part 22A of the second clamp band 22 can have an asymmetric shape with each other relative to the reference plane RP.

As seen in FIG. 12, the first center axis A4 is included in the reference plane RP. The first center axis A4 is coincident with the reference plane RP as viewed in a direction which is parallel to the reference plane RP and which is different from a direction of the first center axis A4. However, the first center axis A4 does not need to be included in the reference plane RP. The first center axis A4 can be arranged to intersect or not to interest with the reference plane RP.

The additional center axis A6 is included in the reference plane RP. The additional center axis A6 is coincident with the reference plane RP as viewed in a direction which is parallel to the reference plane RP and which is different from a direction of the additional center axis A6. However, the additional center axis A6 does not need to be included in the reference plane RP. The additional center axis A6 can be arranged to intersect or not to interest with the reference plane RP.

The additional hole 102 is provided on the reference plane RP. The reference plane RP extends through the additional hole 102 as viewed in a direction parallel to the reference plane RP. However, the additional hole 102 can be provided at a position where the reference plane RP does not extend through the additional hole 102 as viewed in a direction parallel to the reference plane RP.

As seen in FIG. 5, the cylinder center axis A3 is included in the reference plane RP. The cylinder center axis A3 is coincident with the reference plane RP as viewed in a direction which is parallel to the reference plane RP and which is different from a direction of the cylinder center axis A3. However, the cylinder center axis A3 does not need to be included in the reference plane RP. The cylinder center axis A3 can be arranged to intersect or not to interest with the reference plane RP.

As seen in FIG. 13, the mount center axis A2 is included in the reference plane RP. The mount center axis A2 is coincident with the reference plane RP as viewed in a direction which is parallel to the reference plane RP and which is different from a direction of the mount center axis A2. However, the mount center axis A2 does not need to be included in the reference plane RP. The mount center axis A2 can be arranged to intersect or not to interest with the reference plane RP.

Figure 14:
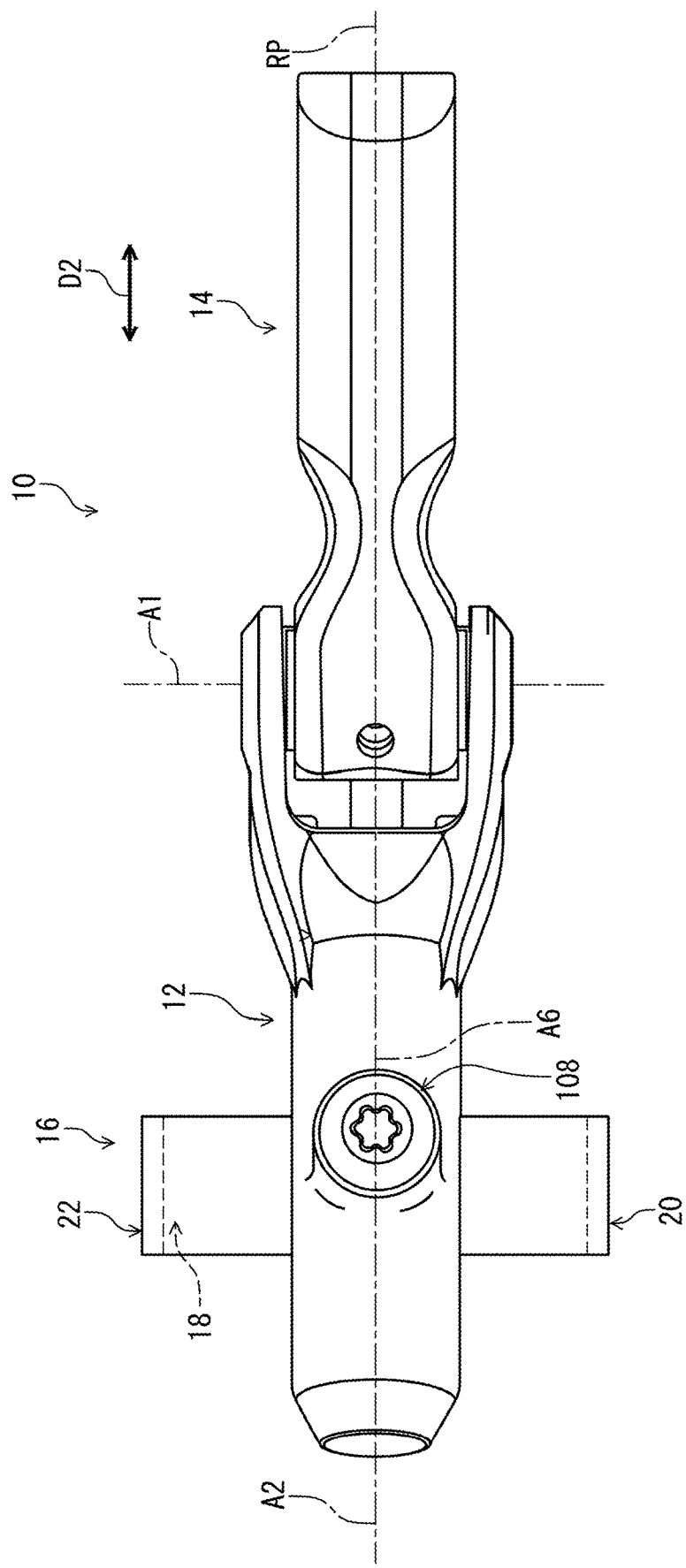
FIG. 14 is a front view of the hydraulic operating device of the human-powered vehicle illustrated in FIG. 1.

As seen in FIGS. 13 and 14, the base member 12 has a symmetric shape relative to the reference plane RP. The operating member 14 has a symmetric shape relative to the reference plane RP. The operating member 14 is movable relative to the base member 12 along the reference plane RP. The operating member 14 is provided on the reference plane RP. The reference plane RP extends through the operating member 14 as viewed in a direction parallel to the reference plane RP. However, the base member 12 can have an asymmetric shape relative to the reference plane RP. The operating member 14 can have an asymmetric shape relative to the reference plane RP. The operating member 14 can be provided at a position where the reference plane RP does not extend through the operating member 14 as viewed in a direction parallel to the reference plane RP.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" as used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic operating device comprising:
    a base member including
        a cylinder bore,
        a first hose-attachment hole configured to be in fluid communication with the cylinder bore, and
        a second hose-attachment hole configured to be in fluid communication with the cylinder bore;
    an operating member pivotally coupled to the base member about a pivot axis;
    a piston movably provided in the cylinder bore and operatively coupled to the operating member to move relative to the base member in response to a pivotal movement of the operating member; and
    a mounting member configured to couple the base member to a handlebar, the mounting member including a mount opening through which the handlebar is to extend, the first hose-attachment hole, the second hose-attachment hole, and the mount opening being provided on a reference plane perpendicular to the pivot axis.

2. The hydraulic operating device according to claim 1, wherein the mount opening has a mount center axis included in the reference plane.

3. The hydraulic operating device according to claim 1, wherein the first hose-attachment hole has a first center axis included in the reference plane.

4. The hydraulic operating device according to claim 1, wherein the second hose-attachment hole has a second center axis included in the reference plane.

5. The hydraulic operating device according to claim 1, wherein the cylinder bore has a cylinder center axis included in the reference plane.

6. The hydraulic operating device according to claim 1, wherein the base member has a symmetric shape relative to the reference plane.

7. The hydraulic operating device according to claim 1, wherein the mount opening has a symmetric shape relative to the reference plane.

8. The hydraulic operating device according to claim 1, wherein the operating member has a symmetric shape relative to the reference plane.

9. The hydraulic operating device according to claim 1, wherein
the base member includes an additional hole configured to be in fluid communication with the cylinder bore.

10. The hydraulic operating device according to claim 9, wherein
the additional hole has an additional center axis included in the reference plane.

11. The hydraulic operating device according to claim 9, wherein
the cylinder center axis is provided between the first hose-attachment hole and the additional hole as viewed along the pivot axis.

12. The hydraulic operating device according to claim 9, further comprising
a plug threadedly engaged with the additional hole.

13. The hydraulic operating device according to claim 1, wherein
the mount opening has a mount center axis, and
at least one of the first hose-attachment hole and the second hose-attachment hole faces toward the mount center axis of the mount opening as viewed along the pivot axis.

14. The hydraulic operating device according to claim 1, wherein
the mount opening has a mount center axis, and
the first hose-attachment hole and the second hose-attachment hole are closer to the mount center axis than the pivot axis in a perpendicular direction perpendicular to both the pivot axis and the mount center axis.

15. The hydraulic operating device according to claim 1, wherein
the mount opening has a mount center axis, and
the first hose-attachment hole and the second hose-attachment hole are provided between the pivot axis and the mount center axis in a perpendicular direction perpendicular to both the pivot axis and the mount center axis.

16. The hydraulic operating device according to claim 1, wherein
the mount opening has a mount center axis, and
the first hose-attachment hole is provided between the pivot axis and the second hose-attachment hole in a mount axis direction parallel to the mount center axis.

17. The hydraulic operating device according to claim 1, wherein
the mount opening has a mount center axis,
the cylinder bore has a cylinder center axis, and
the cylinder center axis is non-perpendicular to the mount center axis as viewed along the pivot axis.

18. The hydraulic operating device according to claim 1, wherein
the mount opening has a mount center axis,
the cylinder bore has a cylinder center axis, and
the cylinder center axis is non-parallel to the mount center axis as viewed along the pivot axis.

19. The hydraulic operating device according to claim 1, wherein
the mount opening has a mount center axis,
the base member includes a support portion configured to contact an outer circumferential surface of the handlebar without clamping the handlebar in a mounting state where the handlebar extends through the mount opening of the mounting member, and
the support portion is spaced apart from the mounting member in a mount axis direction parallel to the mount center axis.

20. The hydraulic operating device according to claim 19, wherein
the support portion includes a groove through which a hydraulic hose attached to one of the first hose-attachment hole and the second hose-attachment hole is to extend in the mounting state.

* * * * *